United States Patent [19]
Mattson

[11] 3,847,412
[45] Nov. 12, 1974

[54] INFLATING PLUG
[76] Inventor: John E. Mattson, 26136 Hampden, Madison Heights, Mich. 48071
[22] Filed: June 27, 1972
[21] Appl. No.: 266,544

[52] U.S. Cl.............. 280/150 AB, 137/70, 137/538, 137/580, 137/625.3, 138/45
[51] Int. Cl............................................ B60r 21/08
[58] Field of Search .............. 280/150 AB; 23/281; 137/67, 68, 69, 70, 538, 580, 625.3, 625.13

[56] References Cited
UNITED STATES PATENTS

| | | | |
|---|---|---|---|
| 3,305,319 | 2/1967 | Kowalick et al. | 23/281 |
| 3,547,467 | 12/1970 | Pociask | 280/150 AB |
| 3,638,964 | 2/1972 | Chute | 280/150 AB |
| 3,653,684 | 4/1972 | Plummer | 280/150 AB |
| 3,738,681 | 6/1973 | Wada et al. | 280/150 AB |

Primary Examiner—David Schonberg
Assistant Examiner—John P. Silverstrim
Attorney, Agent, or Firm—David A. Maxon

[57] ABSTRACT

A ballistic missile traveling within a translational guide operable to provide a forward pneumatic leak forward of a substantial portion of pneumatic inflation so as to reduce significantly the transient pneumatic inflation shock on a previously compactly folded inflatable bag.

9 Claims, 6 Drawing Figures

INFLATING PLUG

This invention relates generally to inflatable bags for use on motor vehicles to prevent or reduce inuries to occupants of a motor vehicle, resulting from a sudden deceleration of the vehicle. More particularly, this invention relates to the provision of a ballistic structure operable to reduce pneumatic transient shock in the inflating device while permitting rapid inflation.

In the past, efforts have been made to design a practical inflating bag device for use in motor vehicles. The objective in these designs has been to provide a device that will sufficiently restrain motion of occupants of the vehicle with respect to the vehicle itself during sudden deceleration.

This requires a rapid inflation of the bag responsive to a sudden deceleration signal.

One of the difficulties in obtaining this design objective has been the requirement for generating the deceleration signal responsive to a shock consonant with striking an object or other accidental mishaps and yet not generating such a deceleration signal resulting from a sudden but otherwise safe stopping of the vehicle or slowing down of the vehicle or traversing a rough road and encountering sudden ruts and bumps in the road.

Still another problem in obtaining the aforementioned design objective is the problem of inflating the bag relatively evenly and smoothly and yet accomplishing the inflation in a relatively short period of time.

Accordingly, it is an object of this invention to provide means of inflating a bag responsive to a sudden deceleration signal that facilitates rapid and yet smooth and uniform inflation to provide a resultant resilient cushion for passengers in an automotive vehicle.

These and other objects of this invention can be discerned from the following specifications and claims. These and other objects of this invention are obtained by the provision of an inflatable plug having a first right circular cylindrical surface corresponding to and continuous with and translating with respect to a right circular inner hollow surface of a tube conducting gas outwardly therefrom through apertures in the tube to an inflatable bag compactly folded around the outer surface of the tube. The plug has a conduit about the geometric center thereof and enclosed by the aft outer peripheral portion of the plug and conducting gas to radially disposed apertures. These last mentioned apertures break into the aforementioned continuous right circular cylindrical surface of the plug.

ON THE DRAWINGS

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein are for the purpose of description and not of limitation.

AS SHOWN ON THE DRAWINGS

Figure 1:
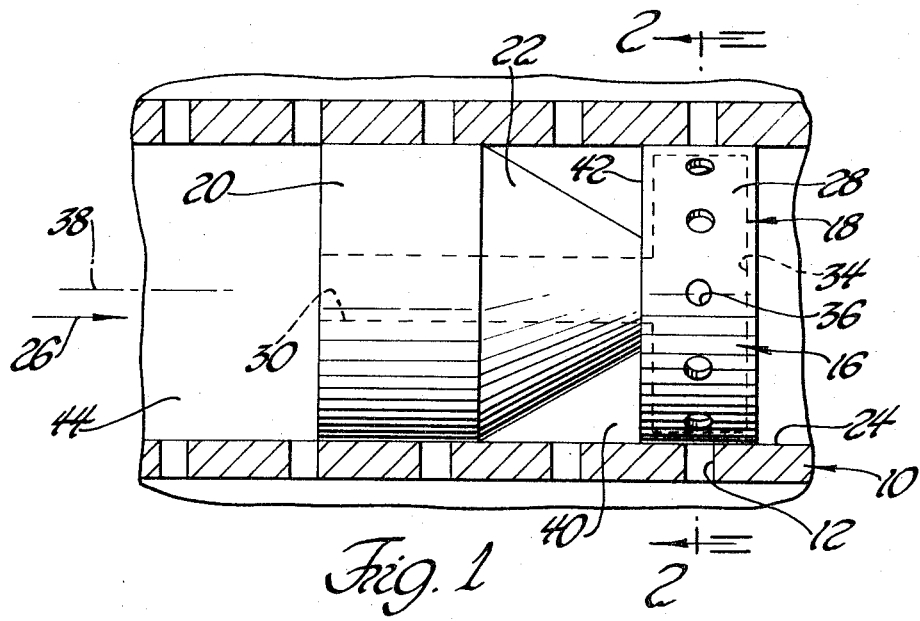
FIG. 1 is a partial transverse sectional view of a portion of the preferred embodiment of this invention.
Figure 2:
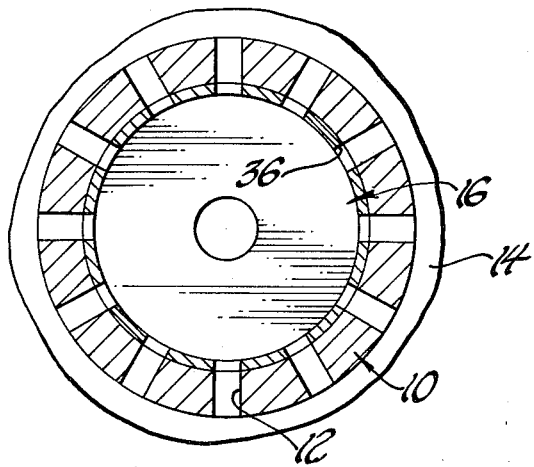
FIG. 2 is a transverse sectional view of the plug used in the preferred embodiment of this invention.

As shown in FIGS. 1 and 2, a steel tube 10 has apertures 12 leading radially outwardly to a bag 14 shown in FIGS. 1 and 2 in its deflated condition. The plug 16 has a forward portion 18 and an aft portion 20 and a midsection 22. The outer surfaces of forward and aft portions 18 and 20 are right circular cylindrical surfaces coaxial with the inner right circular surfaces of the cylindrical surfaces 24 of the tube 10. The outer cylindrical surfaces of forward and aft portions 18 and 20 of the plug 16 are slightly smaller in radius than the corresponding radius of the inner cylindrical surfaces of the tube 10. This slight difference is sufficient to allow sliding translation in the direction of arrow 26 without allowing any significant gas leakage ahead of the forward portion 18 of the plug 16.

The outer surfaces of the midsection 22 of the plug 16 is a right circular surface frusto conical. An inner chamber also being substantially right circular cylindrical in shape is provided in the forward section 18 as indicated by the numeral 28.

A central right circular cylindrical surface aperture 30 passes from the aft surface 32 of the aft portion 20 through the middle of the midsection 22 and communicates with the chamber 28 of the forward section 18 of the plug 16. This inner tube or aperture 30 is coaxial with the previously mentioned cylindrical surfaces.

It can be appreciated from the foregoing description that gas under pressure aft of surface 32 enters aperture 30 and is conducted to chamber 28 where it reacts against inner surface 34 at the forward edge of chamber 28 imparting force in the direction of arrow 26 on the plug 16 before passing out through apertures 36 of the forward section 18 when such apertures 36 are communicative with apertures 12 in the tube 10. The apertures 36 are in a circular radial array about central axis 38. It can be appreciated from the foregoing description that when gas is communicated through the apertures 36 with any turbulence, a rotation about axis 38 of the plug 16 can be induced.

In an alternative embodiment of this invention, the radius of external right cylindrical surfaces of the aft portion 20 can be less than the corresponding radius of the corresponding right circular cylindrical surfaces of the forward section 18. If this is done, additional gas leakage can be communicated to chambers 40 bounded by the exterior conical section of midsection 22, the interior surface 24 of the tube 10 and the aft surface 42 of the forward section 18 of the plug 16.

It can be appreciated from the foregoing description that means have been provided to allow a small amount of gas to be fed to the bag 14 forward of and previous to inflation of the gas from the region 44 aft of the plug directly through the apertures 12. This is preferably done by passing through first the aperture 30, chamber 28 and apertures 36 prior to entry through apertures 12 of the tube. By providing this forward gas leadage or bleeding into the air bag, the transient shock effect of a sudden gas pressure is reduced and allows for even inflation of the bag. By a more uniform rate to inflation thus provided, stresses on the bag in the process of inflation are substantially reduced.

Figure 3:
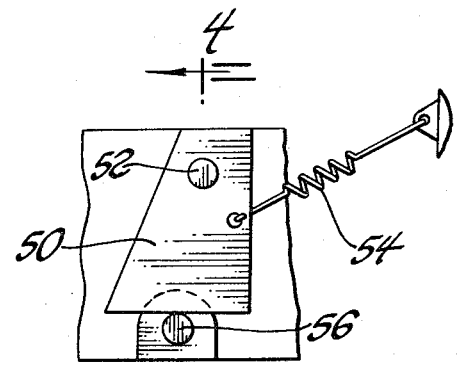
FIG. 3 is a side view of a plate used in generating a sudden deceleration signal in the preferred embodiment of this invention in conjunction with associated apparatus.
Figure 4:
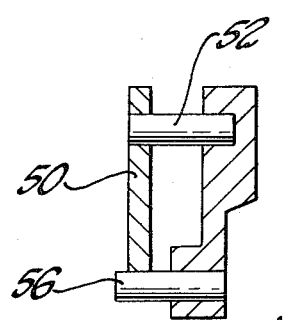
FIG. 4 is a sectional view taken along the lines 4—4 of FIG. 3.

FIGS. 3 and 4 illustrate one means of providing a signal to which the translation of the plug 16 is responsive. This comprises a plate 50 pivotably mounted on axle 52 and urged by spring 54 to rotate about axle 52. A limit 56 is provided to prevent the rotation of plate 50 about axle 52. When the inertia of limit 56 is sufficiently different from that of the plate 50, the force in spring 54 is sufficient to induce rotation of the plate 50. By linkages and other suitable means the translation of the inflating plug 16 can be made responsive to the rotation of plate 50.

These means include a bottle-like gas container (not shown) stopped by plug 16 and a limit member (not shown) inhibiting movement of the plug 16. The limit member can be deactuated responsive to rotation of plate 50 about axle 52 in a manner well known in the mechanical arts.

The above described embodiment is operable to restrain a passenger or driver from movement during sudden deacceleration of the vehicle or collison, thereby preventing serious bodily injury.

Figure 5:
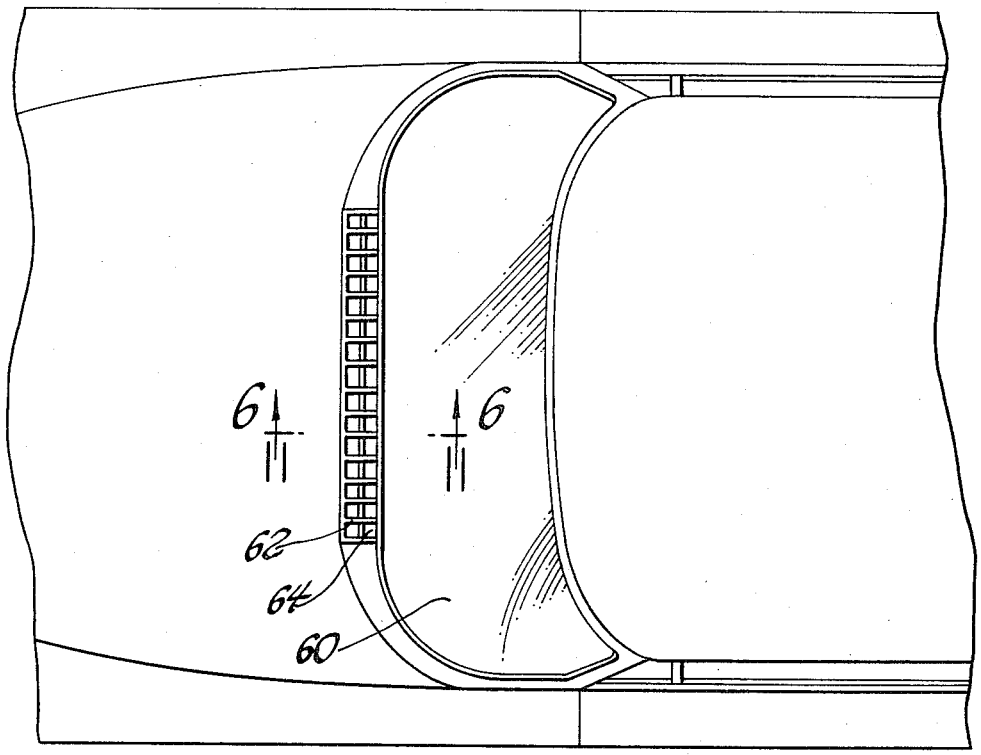
FIG. 5 is a partial top view of an automobile utilizing a preferred embodiment of this invention.
Figure 6:
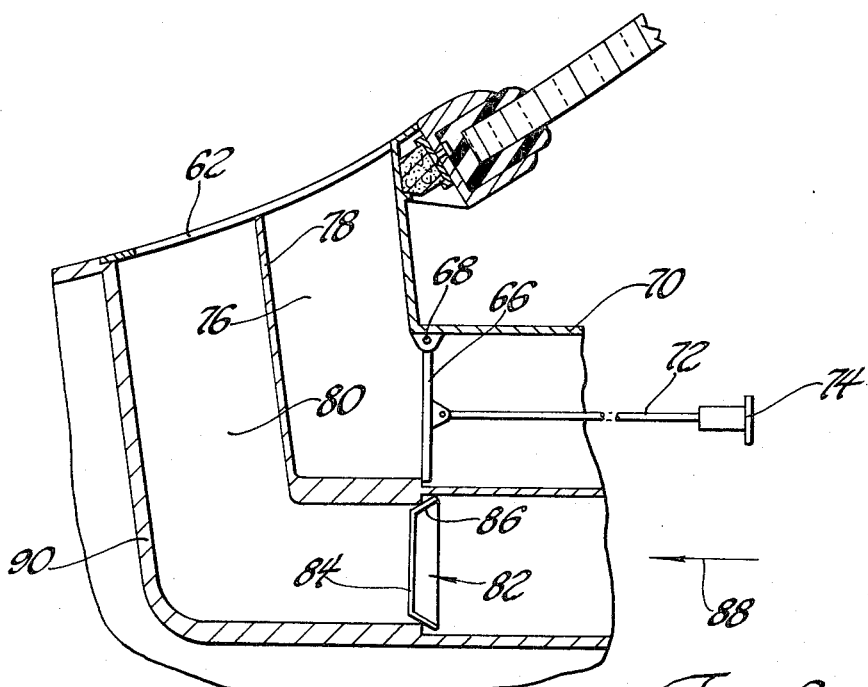
FIG. 6 is a partial transverse sectional view of the apparatus shown in FIG. 5 taken along the section lines 5—5 thereof.

FIGS. 5 and 6 illustrate a means of reducing transient compression of air within the cabin 60 of an automobile utilizing the present invention. An automobile has a fresh air inlet manually operable by the apparatus indicated in FIG. 6 including a grill 62 that has open vents 64 leading to the atmosphere. A door 66 is hinged at point 68 to the body of the car 70 and operable to be rotated about the hinge 68 by translation of link 72 by pulling of the button 74 manually, where intake into the cabin 60 of the automobile provides fresh air. In the preferred embodiment of this invention, the chamber 76 through which the fresh air flows is divided by a wall 78 forming an additional chamber 80 also communicative with the grill 62 leading to the outer atmosphere. A plug 82 is provided having a vertical wall member 84 and wedge-like slanted wall portions 86 engaging an end of chamber 80. When pressure in the direction of arrow 88 exceeds a predetermined value, the plug 82 is driven forward in the direction of arrow 88 against wall portion 90 of the chamber 80. This will cause the air pressure in the direction of 88 to vent through the grill 62.

In the preferred embodiment of this invention, when the air bag begins to inflate substantially, it takes up a substantial amount of volume within the cabin 60 of the automobile. This will cause a sudden and transient increase of air pressure within the cabin which is relieved by the apparatus indicated in FIGS. 5 and 6 discussed immediately above.

I claim:

1. In an automotive vehicle cabin having an inflatable bag operable to inflate within the cabin providing a soft bumper and passenger motion restraint responsive to a preselected threshhold of deacceleration of the automotive vehicle, the improvements comprising:
   a tube for conducting gas to the inflatable bag;
   the inflatable bag being wrapped around said tube prior to inflation;
   said tube having apertures for conducting gas from inside the tube to the bag;
   a plug preventing passage of gas through the tube operable to slide through the interior of the tube, allowing passage of gas through the tube;
   said plug having a hollow portion for conducting gas from aft of the plug to immediately aft of the forward face of the plug and to said bag in an amount and rate substantially less than gas being fed to the bag immediately aft of the plug.

2. The apparatus of claim 1 wherein said hollow portion comprises an aft interior chamber communicating with a forward interior chamber and a plurality of apertures leading from said interior forward chamber of the plug to the exterior of the plug and interior of said tube.

3. The apparatus of claim 2 wherein said plug has a forward portion with an exterior right circular cylindrical shape coaxial and flush with the interior surface of said tube and an aft portion with an external right circular cylindrical surface co-axial with and flush with said tube and a middle portion having an exterior surface connecting and integral with said forward and aft portions having a narrowed shank external surface defining a chamber external to the plug but interior to the tube between said forward and aft sections of the plug.

4. The apparatus of claim 3 wherein said forward interior chamber is within said forward section and said aft interior chamber passes through said aft portion and said middle portion of said plug.

5. The apparatus of claim 4 wherein said apertures leading from said forward portion of said plug to externally of the plug are in radially array about the central axis of all of the right circular cylindrical configurations aforementioned.

6. The apparatus of claim 1 wherein said tube has a plurality of apertures longitudinally and radially dispersed about the central axis of said tube and said bag being tightly wrapped about said tube and operable to be inflated through said plurality of said apertures.

7. The apparatus of claim 1 and means for forcing said plug through said tube by expanding gas behind the plug responsive to movement of a mechanical member about an axis.

8. The apparatus of claim 7 wherein said mechanical member is biased against rotation and has an additional limit against translation that is rendered inoperable responsive to a predetermined threshold of force.

9. The apparatus of claim 1 and means for venting said cabin responsive to a predetermined threshold of air pressure within said cabin.

* * * * *